(12) United States Patent
Matsunami et al.

(10) Patent No.: US 11,885,366 B2
(45) Date of Patent: Jan. 30, 2024

(54) PIERCING NUT AND METHOD FOR FIXING THE SAME TO INNER SURFACE OF MATING MEMBER HAVING CLOSED SECTIONAL SHAPE

(71) Applicant: AOYAMA SEISAKUSHO CO., LTD., Niwa-Gun (JP)

(72) Inventors: Shigeki Matsunami, Niwa-Gun (JP); Kazuhiro Koga, Niwa-Gun (JP); Keiichiro Masui, Niwa-Gun (JP); Kenichiro Araki, Niwa-Gun (JP); Tsuyoshi Kojima, Niwa-Gun (JP); Yuichi Katsumata, Niwa-Gun (JP)

(73) Assignee: Aoyama Seisakusho Co., Ltd., Niwa-Gun (JP)

( * ) Notice: Subject to any disclaimer, the term of this patent is extended or adjusted under 35 U.S.C. 154(b) by 55 days.

(21) Appl. No.: 17/580,829

(22) Filed: Jan. 21, 2022

(65) Prior Publication Data

US 2022/0145925 A1    May 12, 2022

Related U.S. Application Data

(63) Continuation of application No. PCT/JP2021/019915, filed on May 26, 2021.

(30) Foreign Application Priority Data

Jun. 30, 2020  (JP) ................................ 2020-113082

(51) Int. Cl.
   *F16B 37/06*   (2006.01)
(52) U.S. Cl.
   CPC .................... *F16B 37/068* (2013.01)
(58) Field of Classification Search
   CPC ...... F16B 37/068; F16B 37/00; F16B 37/048; B21J 15/02

(Continued)

(56) References Cited

U.S. PATENT DOCUMENTS 3,234,987 A    2/1966  Hentzi
3,282,315 A *  11/1966 Zahodiakin ........... F16B 37/068
                                                411/968

(Continued)

FOREIGN PATENT DOCUMENTS

JP    S48-26096 B1    8/1973
JP    H11-193808 A    7/1999

(Continued)

OTHER PUBLICATIONS

International Search Report and Written Opinion (Application No. PCT/JP2021/019915) dated Jul. 12, 2021.

(Continued)

*Primary Examiner* — Sarang Afzali
*Assistant Examiner* — Darrell C Ford
(74) *Attorney, Agent, or Firm* — BURR PATENT LAW, PLLC

(57) ABSTRACT

A piercing nut according to the present invention includes an internal thread 11, a ring-shaped punching part 12, a ring-shaped groove 16, and a bearing surface 17. The internal thread 11 is formed at the center of a nut main body 10. The ring-shaped punching part 12 protrudes around the outer periphery of the internal thread 11. The ring-shaped groove 16 is formed around the outer periphery of the ring-shaped punching part 12. The bearing surface 17 protrudes around the outer periphery of the ring-shaped groove 16. The height h of the ring-shaped punching part 12 is equal to or lower than the height H of the bearing surface 17 in the opposite manner to the conventional technique.

11 Claims, 5 Drawing Sheets

(58) Field of Classification Search
USPC .................................. 411/179–180
See application file for complete search history.

(56) References Cited

U.S. PATENT DOCUMENTS

| | | | | |
|---|---|---|---|---|
| 3,299,500 | A | * | 1/1967 | Double .................... B21B 1/08 411/968 |
| 3,724,520 | A | | 4/1973 | Ladouceur et al. |
| 3,878,599 | A | * | 4/1975 | Ladouceur ............ B21D 51/40 29/523 |
| 3,927,465 | A | * | 12/1975 | Ladouceur ............ F16B 37/068 29/524.1 |
| 5,067,224 | A | * | 11/1991 | Muller .................. F16B 37/068 29/798 |
| 5,092,724 | A | * | 3/1992 | Muller .................. F16B 37/065 411/181 |
| 11,725,685 | B2 | * | 8/2023 | Fujimoto ................ F16B 35/06 411/161 |
| 2014/0248104 | A1 | | 9/2014 | Tanaka et al. |

FOREIGN PATENT DOCUMENTS

| | | |
|---|---|---|
| JP | 2008-223877 A | 9/2008 |
| JP | 2014-043883 A | 3/2014 |

OTHER PUBLICATIONS

Japanese Office Action (with English translation) dated Feb. 14, 2023 (Application No. 2022-502161).

* cited by examiner

PRIOR ART

PRIOR ART

PIERCING NUT AND METHOD FOR FIXING THE SAME TO INNER SURFACE OF MATING MEMBER HAVING CLOSED SECTIONAL SHAPE

TECHNICAL FIELD

The present invention relates to a piercing nut attached to a mating member having a closed sectional shape, such as square lumber and aluminum extruded material, and a method for fixing the piercing nut to the inner surface of the mating member having a closed sectional shape.

BACKGROUND ART

Piercing nuts clinched and fixed to a mating member by being driven into it have been widely known as described in Patent Literature 1. As illustrated in FIG. 1, a conventional piercing nut typically includes an internal thread 1, a ring-shaped punching part 2, a ring-shaped groove 3, and a bearing surface 4. The ring-shaped punching part 2 protrudes around the outer periphery of the internal thread 1. The ring-shaped groove 3 and the bearing surface 4 are formed around the outer periphery of the ring-shaped punching part 2. The ring-shaped punching part 2 protrudes above the bearing surface 4 to reliably punch the mating member.

As illustrated in FIG. 2, the piercing nut is set on the surface of a mating member W and driven into the mating member W using a die 5 disposed on the back surface of the mating member W and a punch 6. Simultaneously with the driving, the ring-shaped punching part 2 forms a through hole in the mating member W and causes metal around the through hole to plastically flow into the ring-shaped groove 3 formed around the outer periphery of the ring-shaped punching part 2. As a result, the piercing nut is clinched and fixed to the mating member W. In this case, the piercing nut is moved and driven into the mating member W fixed by the die 5.

To attach the piercing nut to the inner surface of the mating member W having a closed sectional shape, such as square lumber and aluminum extruded material as illustrated in FIG. 3, it is impossible to move the punch 6 inside the mating member W. In this case, the punch 6 is fixed inside the mating member W, and the die 5 is lowered from outside the mating member W to clinch the piercing nut.

In the state illustrated in FIG. 3, the tip of the ring-shaped punching part 2 is in contact with the inner surface of the mating member W, and a gap 7 is formed between the inner surface and the bearing surface 4. If the die 5 is lowered to drive the piercing nut as illustrated in FIG. 4, the mating member W is pushed down to come into contact with the bearing surface 4 at the same time when the ring-shaped punching part 2 pierces the mating member W. In this case, the mating member W is moved to the fixed piercing nut unlike the conventional technique illustrated in FIG. 2. As a result, the position of a mounting surface 8 of the mating member W for the piercing nut is made lower than the surrounding part by the gap 7. Accordingly, there is a disadvantage in that an undesirable recess is formed when another member 9 is fixed with a bolt as illustrated in FIG. 5.

CITATION LIST

Patent Literature

PTL 1

Japanese Patent Application Laid-open No. 2014-43883

SUMMARY OF INVENTION

Technical Problem

In view of the conventional disadvantage described above, an object of the present invention is to provide a piercing nut that prevents the position of a piercing nut mounting surface from being lowered when the piercing nut is attached to a mating member having a closed sectional shape and a method for fixing the piercing nut to the inner surface of the mating member having a closed sectional shape.

Solution to Problem

A piercing nut according to the present invention to solve the problem described above includes: an internal thread formed at a center of a nut main body; a ring-shaped punching part protruding around an outer periphery of the internal thread; a ring-shaped groove formed around an outer periphery of the ring-shaped punching part; and a bearing surface protruding around an outer periphery of the ring-shaped groove, and the height of the ring-shaped punching part is equal to or lower than the height of the bearing surface. The depth of the ring-shaped groove is preferably 1.2 to 2.0 times the plate thickness of a mating member. The height of the ring-shaped punching part preferably is at a position at a height percentage of 50 to 99% from a bottom surface of the ring-shaped groove within a range between the bottom surface of the ring-shaped groove and the bearing surface. An outer peripheral wall of the ring-shaped groove preferably has a serration.

A method for fixing a piercing nut to an inner surface of a mating member having a closed sectional shape according to the present invention to solve the problem described above includes: holding the above-described piercing nut on the inner surface of the mating member having the closed sectional shape and bringing the bearing surface of the piercing nut into contact with the inner surface of the mating member; lowering a die disposed outside the mating member and punching the mating member by a ring-shaped protrusion of the die; and clinching and fixing the piercing nut to the inner surface of the mating member while supporting the mating member on the bearing surface of the piercing nut.

Advantageous Effects of Invention

The piercing nut according to the present invention has a non-conventional structure in which the height of the ring-shaped punching part is equal to or lower than the height of the bearing surface. In attaching the piercing nut to the mating member having a closed sectional shape, driving by the die is completed with the mating member remaining in contact with the bearing surface of the piercing nut. Consequently, unlike the conventional technique, the piercing nut according to the present invention can prevent the height of a mounting surface of the mating member from being lowered, thereby preventing the part surrounding the mounting surface from being deformed and recessed.

The depth of the ring-shaped groove is usually equivalent to or smaller than the plate thickness of the mating member. By making the depth of the ring-shaped groove larger than the plate thickness of the mating member by 1.2 to 2.0 times, which is larger than that of the conventional piercing nut, the punching and clinching effects are not reduced if the height of the ring-shaped punching part is lower than that of the bearing surface.

DESCRIPTION OF EMBODIMENTS

Figure 1:
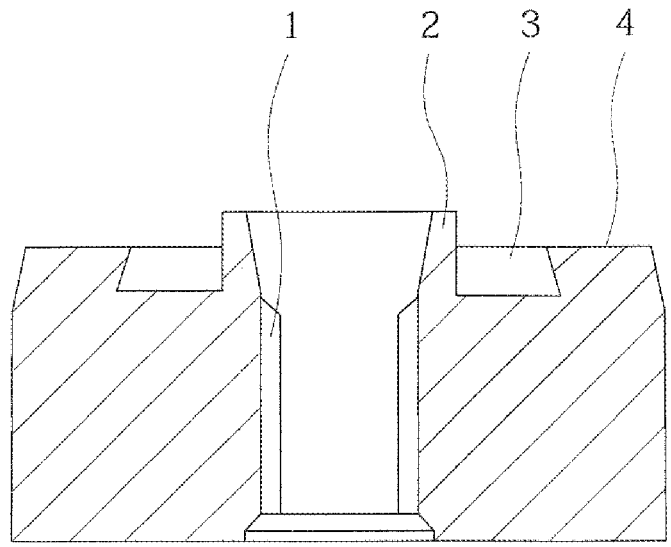
FIG. 1 is a sectional view illustrating a conventional piercing nut.
Figure 2:
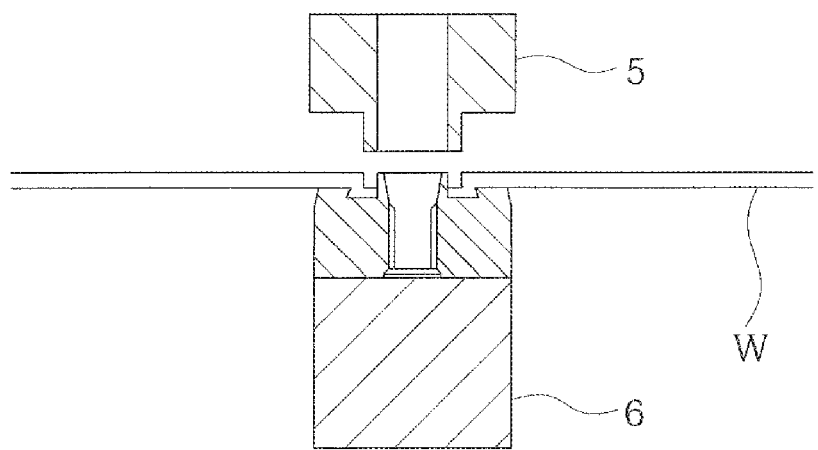
FIG. 2 is a sectional view illustrating a state where the conventional piercing nut is driven into a planar mating member.
Figure 3:
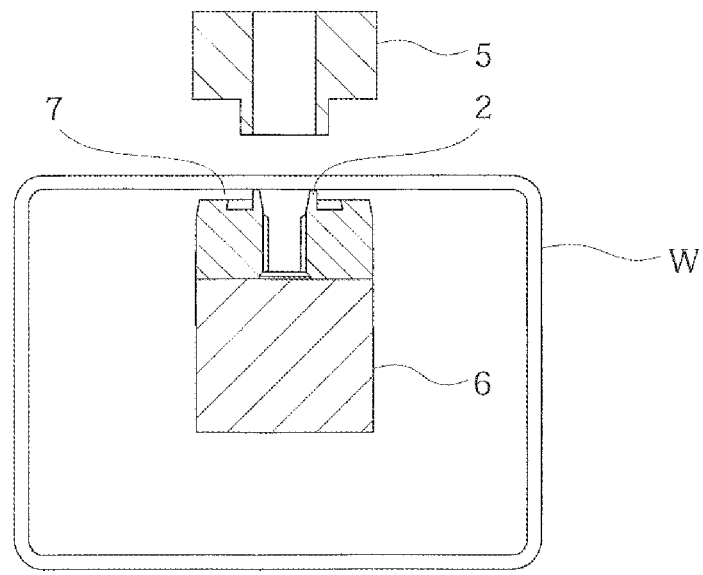
FIG. 3 is a sectional view illustrating a state right before the conventional piercing nut is driven into a mating member having a closed sectional shape.
Figure 4:
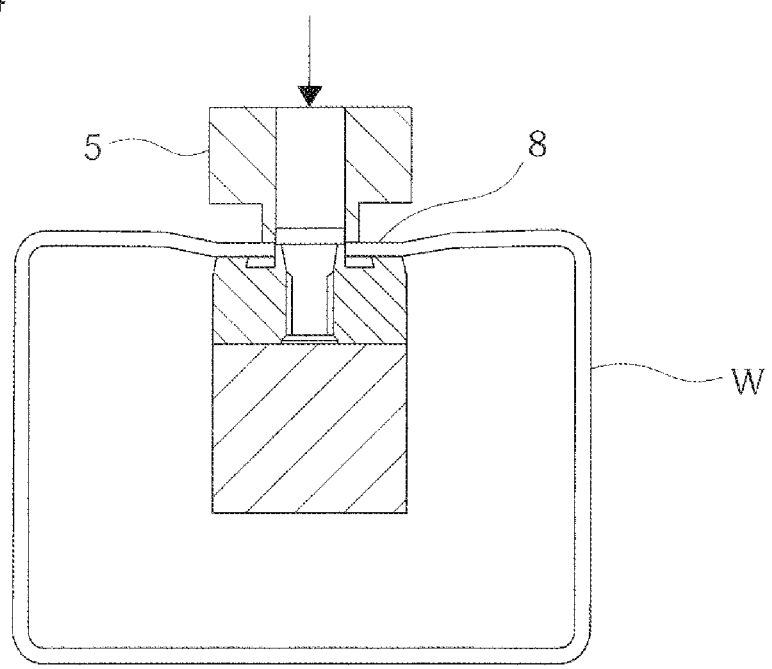
FIG. 4 is a sectional view illustrating a state where the conventional piercing nut is being driven into the mating member having a closed sectional shape.
Figure 5:
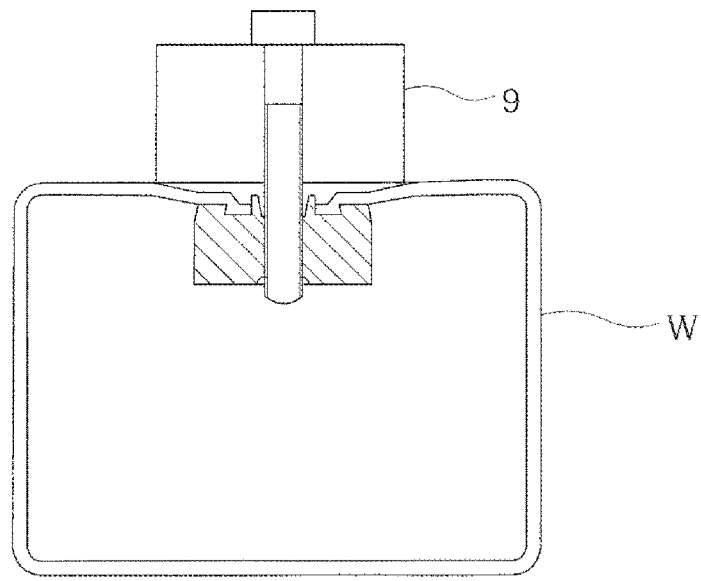
FIG. 5 is a sectional view illustrating a problem occurring when the conventional piercing nut is driven into the mating member having a closed sectional shape.
Figure 6:
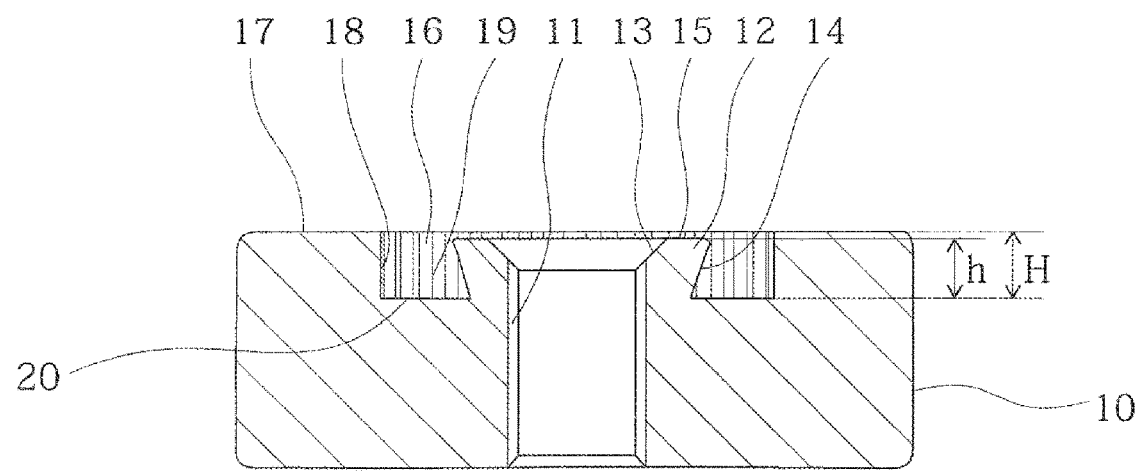
FIG. 6 is a sectional view illustrating a piercing nut according to an embodiment of the present invention.

Exemplary embodiments according to the present invention are described below. FIG. 6 is a sectional view of a piercing nut according to an embodiment. In FIG. 6, reference numeral 10 denotes a nut main body made of steel, reference numeral 11 denotes an internal thread formed at the center of the nut main body 10, and reference numeral 12 denotes a ring-shaped punching part protruding around the outer periphery of the internal thread 11. As illustrated in FIG. 6, an inner peripheral wall 13 and an outer peripheral wall 14 of the ring-shaped punching part 12 form a tapered shape, and a punching surface 15 serving as the upper surface is made flat. In the structure according to the present embodiment, the inner peripheral wall 13 inclines at approximately 45 degrees with respect to the punching surface 15, and the outer peripheral wall 14 inclines at approximately 75 degrees with respect to the punching surface 15. The inclination angles are not limited to the angles described above.

Reference numeral 16 denotes a ring-shaped groove formed around the outer periphery of the ring-shaped punching part 12, and a flat bearing surface 17 is formed around the outer periphery of the ring-shaped groove 16. An outer peripheral wall 18 of the ring-shaped groove 16 according to the present embodiment is perpendicular to the bearing surface 17 and has serrations 19. The bearing surface 17 may have recesses and protrusions for preventing rotation.

The piercing nut according to the present invention is different from the conventional piercing nut in that a height h of the ring-shaped punching part 12 is equal to or lower than the height of the bearing surface 17. The height h of the ring-shaped punching part 12 means the distance from a bottom surface 20 of the ring-shaped groove 16 to the punching surface 15. A height H of the bearing surface 17 means the distance from the bottom surface 20 of the ring-shaped groove 16 to the bearing surface 17. In the embodiment illustrated in FIG. 6, the height h of the ring-shaped punching part 12 is lower than the height H of the bearing surface 17 by approximately 0.1 mm. If the height h of the ring-shaped punching part 12 is significantly lower than the height H of the bearing surface 17, it is difficult for the ring-shaped punching part 12 to punch the mating member W. For this reason, the height h of the ring-shaped punching part 12 preferably is at a position at a height percentage of 50 to 99% from the bottom surface 20 of the ring-shaped groove within a range between the bottom surface 20 of the ring-shaped groove and the bearing surface 17. In other words, h/H=0.5 to 0.99 is preferably satisfied.

The depth of the ring-shaped groove 16 (equal to the height H of the bearing surface 17) is usually equivalent to or smaller than the plate thickness of the mating member W. The depth of the ring-shaped groove 16 according to the present embodiment, however, is larger than the plate thickness of the mating member W. This structure is employed to suppress deterioration of the punching property due to a decrease in the height of the ring-shaped punching part 12. The depth is preferably 1.2 to 2.0 times of the plate thickness of the mating member W. By making the depth of the ring-shaped groove 16 larger than that of the conventional piercing nut, the punching property can be improved, and the mating member can be caused to plastically flow deeply into the ring-shaped groove 16, thereby also improving the clinching property. If the depth of the ring-shaped groove 16 falls below the numerical range, the punching property and the clinching property become insufficient. If the depth of the ring-shaped groove 16 exceeds the numerical range, the ring-shaped groove 16 fails to be sufficiently filled with the plastically flowing metal. Also in this case, the clinching property may possibly become insufficient.

By forming the serrations 19 on the outer peripheral wall 18 of the ring-shaped groove 16 like the present embodiment, the metal plastically flowing into the ring-shaped groove 16 bites the serrations 19. As a result, the rotation-preventing effect can be increased.

Figure 7:
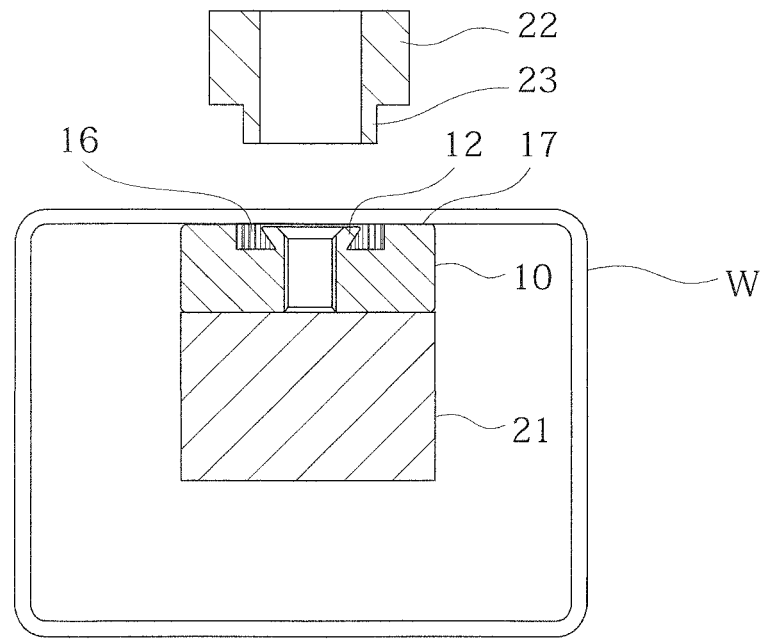
FIG. 7 is a sectional view illustrating a state right before the piercing nut according to the present invention is driven into the mating member having a closed sectional shape.

To attach the piercing nut according to the present invention having the structure described above, the lower surface of the nut main body 10 is supported by a punch 21 in the mating member W having a closed sectional shape, and the piercing nut is pressed against the inner surface of the mating member W as illustrated in FIG. 7. The bearing surface 17 is brought into contact with the inner surface of the mating member W because the bearing surface 17 of the piercing nut is higher than the punching surface 15.

Figure 8:
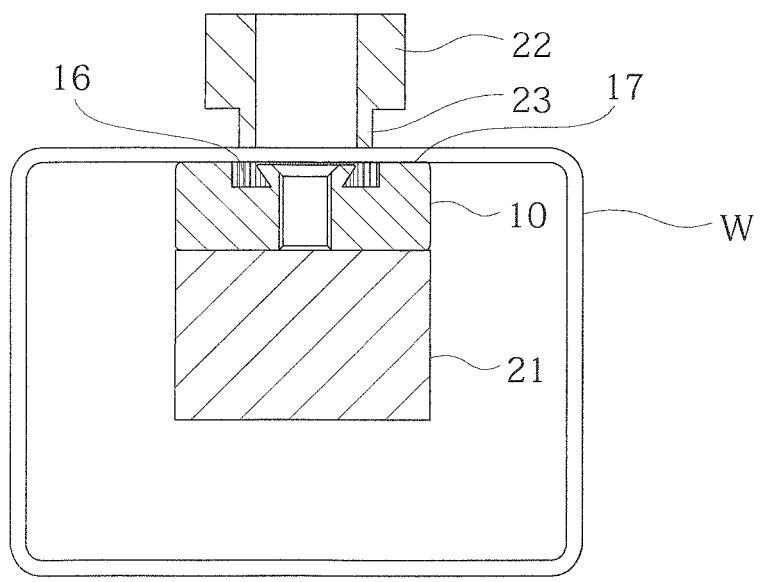
FIG. 8 is a sectional view illustrating a state where the piercing nut according to the present invention is being driven into the mating member having a closed sectional shape.
Figure 9:
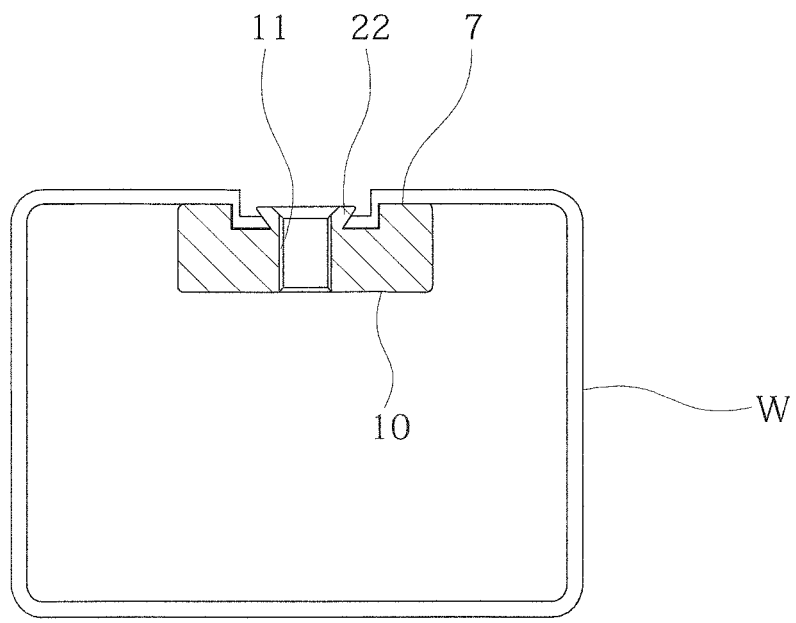
FIG. 9 is a sectional view illustrating a state after the piercing nut according to the present invention is driven into the mating member having a closed sectional shape.

A die 22 is disposed coaxially with the piercing nut outside the mating member W and lowered toward the piercing nut as illustrated in FIG. 8. FIG. 8 illustrates a timing when the lower surface of the die 22 comes into contact with the surface of the mating member W. Subsequently, the die 22 is further lowered, and a ring-shaped protrusion 23 punches out a circular piece from the mating member W. In addition, the die 22 causes the part surrounding the punched-out part to plastically flow into the ring-shaped groove 16, thereby clinching and fixing the piercing nut to the inner surface of the mating member W as illustrated in FIG. 9.

The mating member W remains supported by the bearing surface 17 of the piercing nut. Only the part of the mating member W corresponding to the center of the piercing nut is punched out and plastically deformed. As a result, the part surrounding the mounting surface of the mating member W remains completely flat as illustrated in FIG. 9, and no recess is formed by lowering the mounting surface unlike the conventional technique.

Figure 10:
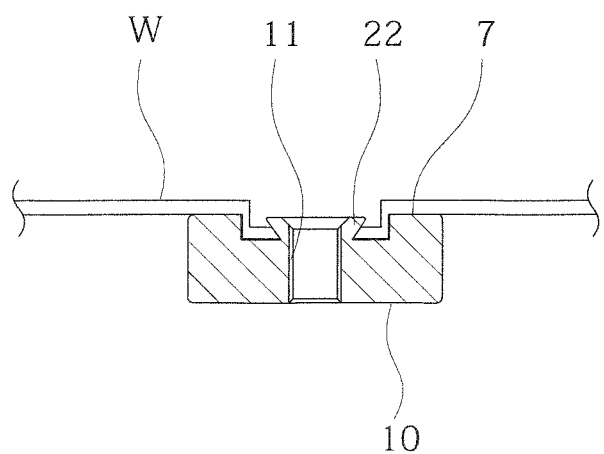
FIG. 10 is a sectional view illustrating a state where the piercing nut according to the present invention is driven into the mating member not having a closed sectional shape.

As described above, the piercing nut according to the present invention is suitably used as a nut attached to the inside of the mating member W having a closed sectional shape in which a punch cannot be inserted. Needless to say, the piercing nut according to the present invention can also be attached to the mating member W not having a closed sectional shape as illustrated in FIG. 10.

REFERENCE SIGNS LIST

W mating member
1 internal thread (conventional piercing nut)
2 ring-shaped punching part
3 ring-shaped groove
4 bearing surface
5 die
6 punch
7 gap
8 mounting surface
9 another member
10 nut main body (piercing nut according to the present invention)
11 internal thread
12 ring-shaped punching part
13 inner peripheral wall
14 outer peripheral wall
15 punching surface
16 ring-shaped groove
17 bearing surface
18 outer peripheral wall
19 serrations
20 bottom surface
21 punch
22 die
23 ring-shaped protrusion

The invention claimed is:

1. A piercing nut comprising:
an internal thread formed at a center of a nut main body;
a ring-shaped punching part protruding around an outer periphery of the internal thread;
a ring-shaped groove formed around an outer periphery of the ring-shaped punching part; and
a bearing surface protruding around an outer periphery of the ring-shaped groove, wherein
an inner peripheral wall and an outer peripheral wall of the ring-shaped punching part form a tapered shape; and
the ring-shaped punching part has a height equal to or lower than that of the bearing surface, and
wherein the outer peripheral wall of the ring-shaped punching part is angled upwardly and outwardly from a bottom surface of the ring-shaped groove.

2. The piercing nut according to claim 1, wherein the piercing nut is attachable to a mating member, and the wherein the ring-shaped groove of the piercing nut has a depth that is 1.2 to 2.0 times of a plate thickness of the mating member.

3. The piercing nut according to claim 2, wherein the height of the ring-shaped punching part is at a position at a height percentage of 50 to 99% from a bottom surface of the ring-shaped groove within a range between the bottom surface of the ring-shaped groove and the bearing surface.

4. The piercing nut according to claim 2, wherein an outer peripheral wall of the ring-shaped groove has a serration.

5. The piercing nut according to claim 1, wherein the height of the ring-shaped punching part is at a position at a height percentage of 50 to 99% from a bottom surface of the ring-shaped groove within a range between the bottom surface of the ring-shaped groove and the bearing surface.

6. The piercing nut according to claim 5, wherein an outer peripheral wall of the ring-shaped groove has a serration.

7. The piercing nut according to claim 1, wherein an outer peripheral wall of the ring-shaped groove has a serration.

8. A method for fixing the piercing nut according to claim 1 to an inner surface of a mating member having a closed sectional shape, the method comprising:
holding the piercing nut on the inner surface of the mating member having the closed sectional shape and bringing the bearing surface of the piercing nut into contact with the inner surface of the mating member;
lowering a die disposed outside the mating member and punching the mating member by a ring-shaped protrusion of the die; and
clinching and fixing the piercing nut to the inner surface of the mating member while supporting the mating member on the bearing surface of the piercing nut.

9. A method for fixing the piercing nut according to claim 2 to an inner surface of a mating member having a closed sectional shape, the method comprising:
holding the piercing nut on the inner surface of the mating member having the closed sectional shape and bringing the bearing surface of the piercing nut into contact with the inner surface of the mating member;
lowering a die disposed outside the mating member and punching the mating member by a ring-shaped protrusion of the die; and
clinching and fixing the piercing nut to the inner surface of the mating member while supporting the mating member on the bearing surface of the piercing nut.

10. A method for fixing the piercing nut according to claim 5 to an inner surface of a mating member having a closed sectional shape, the method comprising:
holding the piercing nut on the inner surface of the mating member having the closed sectional shape and bringing the bearing surface of the piercing nut into contact with the inner surface of the mating member;
lowering a die disposed outside the mating member and punching the mating member by a ring-shaped protrusion of the die; and
clinching and fixing the piercing nut to the inner surface of the mating member while supporting the mating member on the bearing surface of the piercing nut.

11. A method for fixing the piercing nut according to claim 7 to an inner surface of a mating member having a closed sectional shape, the method comprising:
holding the piercing nut on the inner surface of the mating member having the closed sectional shape and bringing the bearing surface of the piercing nut into contact with the inner surface of the mating member;

lowering a die disposed outside the mating member and punching the mating member by a ring-shaped protrusion of the die; and clinching and fixing the piercing nut to the inner surface of the mating member while supporting the mating member on the bearing surface of the piercing nut.

\* \* \* \* \*